US009689054B2

(12) United States Patent
Parkes et al.

(10) Patent No.: US 9,689,054 B2
(45) Date of Patent: Jun. 27, 2017

(54) GOLD RECOVERY

(71) Applicant: HIGH VALUE METALS RECOVERY LTD, Chapelstown, Carlow, Co. Carlow (IE)

(72) Inventors: James Parkes, Chapelstown (IE); Mary Parkes, Chapelstown (IE)

(73) Assignee: HIGH VALUE METALS RECOVERY LTD, Co. Carlow (IE)

(*) Notice: Subject to any disclaimer, the term of this patent is extended or adjusted under 35 U.S.C. 154(b) by 94 days.

(21) Appl. No.: 14/399,565

(22) PCT Filed: May 9, 2013

(86) PCT No.: PCT/EP2013/059687
§ 371 (c)(1),
(2) Date: Nov. 7, 2014

(87) PCT Pub. No.: WO2013/167714
PCT Pub. Date: Nov. 14, 2013

(65) Prior Publication Data
US 2015/0114182 A1    Apr. 30, 2015

(30) Foreign Application Priority Data
May 9, 2012    (EP) ..................... 12167381

(51) Int. Cl.
C22B 7/00    (2006.01)
C22B 11/06    (2006.01)
(Continued)

(52) U.S. Cl.
CPC ............ C22B 11/025 (2013.01); C22B 7/006 (2013.01); C22B 11/046 (2013.01); C22B 11/06 (2013.01); *Y02P 10/214* (2015.11); *Y02P 10/234* (2015.11)

(58) Field of Classification Search
CPC ........ C22B 11/046; C22B 11/06; C22B 7/006
See application file for complete search history.

(56) References Cited

U.S. PATENT DOCUMENTS 3,495,976 A    2/1970    Bazilevsky et al.
3,834,896 A    9/1974    Eisele et al.
(Continued)

FOREIGN PATENT DOCUMENTS

DE    10121946 C1 *    9/2002    ............... C22B 3/10
GB    190920471 A    0/1910
(Continued)

OTHER PUBLICATIONS

Goodman, Paul. "Gold Bulletin." Current and Future Uses of Gold in Electronics 35.1 (2002): 21-26. Web. Jul. 22, 2016.*
(Continued)

*Primary Examiner* — George Wyszomierski
*Assistant Examiner* — Tima M McGuthry Banks
(74) *Attorney, Agent, or Firm* — Leason Ellis LLP

(57) ABSTRACT

The cost of precious metals, such as gold, makes recovery or recycling of these materials economically viable and desirable. Disclosed herein is a method of recovering gold from waste sources thereof, in particular waste electrical goods. Also disclosed herein is an apparatus for recovering gold from said waste sources. In particular, disclosed herein is a method and apparatus in which gold leaching chlorine gas is generated externally to a reactor vessel and subsequently pumped into the reactor vessel comprising the waste gold materials.

17 Claims, 1 Drawing Sheet

(51) Int. Cl.
   *C22B 11/02*  (2006.01)
   *C22B 3/00*  (2006.01)

(56) References Cited

U.S. PATENT DOCUMENTS

| | | | |
|---|---|---|---|
| 3,957,505 A | 5/1976 | Homick et al. | |
| 4,723,998 A | 2/1988 | O'Neil | |
| 2009/0315232 A1* | 12/2009 | Kim | C22B 3/02 266/81 |
| 2010/0257978 A1 | 10/2010 | Bergeron et al. | |
| 2011/0083531 A1* | 4/2011 | Soldenhoff | C22B 3/0009 75/393 |

FOREIGN PATENT DOCUMENTS

| | | | |
|---|---|---|---|
| JP | H01-142038 A | | 6/1989 |
| JP | H11036020 A | * | 2/1999 |
| KR | 20120055350 A | * | 5/2012 |
| WO | 01/83835 A2 | | 11/2001 |

OTHER PUBLICATIONS

Meyer, Horst et al. DE 10121946 C1 published Sep. 2002. Machine translation of the description.*
Takano, Koichi et al. JP H1136020 A published Feb. 1999. Machine translation of the description.*
Jeong Jin Ki et al. KR 20120055350 A published May 2012. Machine translation of the description.*
"International Search Report", European Patent Office (Aug. 28, 2013), PCT/EP2013/059687, 3 pgs.
Hoffman, "Recovering Precious Metals from Electronic Scrap", JOM (Jul. 1992), 44(7):43-48.
Kim; et al., "Selective recovery of gold from waste mobile phone PCBs by hydrometallurgical process", Journal of Hazardous Materials (Dec. 2011), 198:206-215.
Written Opinion in PCT/EP2013/059687 (European Patent Office), dated Nov. 11, 2014.
The Theory Basis for Chlorination of Gold, Hydrometallurgy of China, 1991, 1:26-32.

* cited by examiner

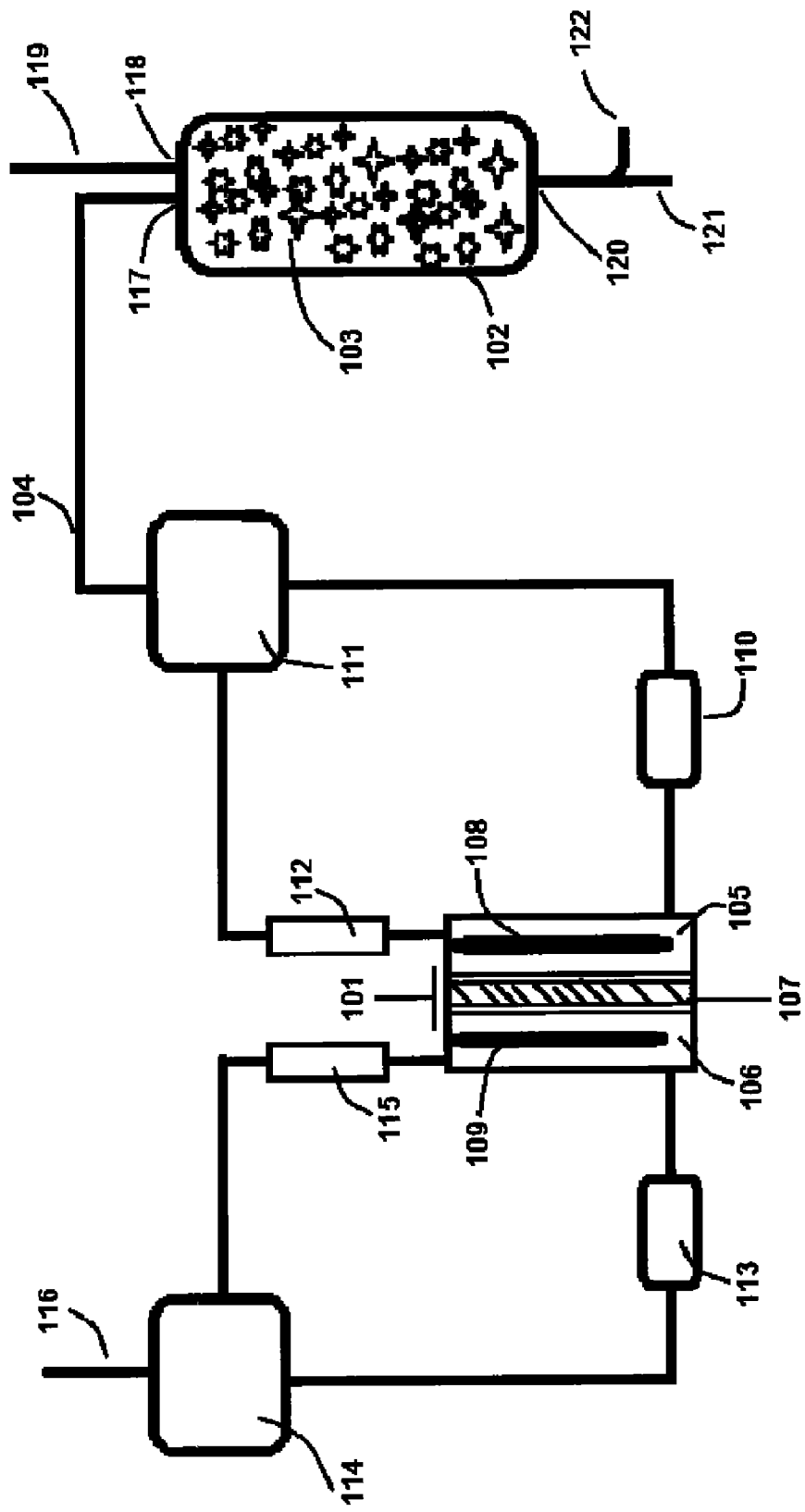

GOLD RECOVERY

FIELD OF THE INVENTION

The present invention relates to a method of recovering gold from waste sources thereof, in particular waste electrical goods. Also disclosed herein is an apparatus for recovering gold from said waste sources.

BACKGROUND TO THE INVENTION

The cost of precious metals, such as gold, makes recovery or recycling of these materials economically viable and desirable. Gold is typically recovered from ores and other impure sources using cyanide, aqua regia or smelting. Such methods suffer from inter alia, toxicity issues, disposal costs and high energy input.

Prior art patents addressing the problem of improving efficiency in gold extraction and recovery are numerous. For example, U.S. Pat. No. 3,834,896 describes a process for recovering gold involving injecting chlorine into an aqueous slurry of carbonaceous ore at high temperature in the presence of iron, aluminium or gallium promoters.

U.S. Pat. No. 4,723,998 discloses a two-step process for extracting gold from carbonaceous or metal oxide based ores. The process comprises using chlorine to dissolve the gold from the ores and subsequently absorbing the gold on to ion exchange resins.

U.S. Pat. No. 3,495,976 communicates a method of recovering gold that has been plated or coated on to non-ferrous metals such as tungsten, molybdenum, or copper. The gold plated material is treated with an aqueous solution of potassium iodide and dissolved iodine. The gold is recovered by adding conc. sulphuric acid and distilling of the iodine. When all the iodine has been removed, the gold is separated from the remaining solution as a powder.

U.S. Pat. No. 3,957,505 discloses a process for extracting gold from gold bearing material comprising: treating the gold bearing material in an aqueous solution consisting essentially of iodine and a water soluble iodide salt to dissolve gold from said gold bearing material; mixing a reducing agent with said aqueous solution to reduce dissolved gold iodide salts to gold metal and precipitate said gold metal in substantially pure form from said aqueous solution. The precipitated gold metal is removed from the aqueous solution. An oxidizing agent is subsequently added to the aqueous solution to restore the solution to substantially its original condition for dissolving gold from further gold bearing material.

G.B. Patent No. 20471 discloses a method of extracting gold from ores thereof. The method discloses utilising an undivided electrolytic cell to generate a leaching material. Once the gold has been leached from the ore it is subsequently electrodeposited on the cathode. This method suffers in that the cathode has to be removed from the electrochemical cell to recover the gold and the cell will have to be cleaned out regularly to remove unwanted sludge, salts and other contaminants.

Hoffmann, J O M, Springer New York, vol 44, no. 7 p 43-48 describes methods for recovering precious metals from electronic scrap involving slurrying the scrap in water and sparging chlorine gas into the slurry. WO 01/83835 A2 describes a gold recovery process in which gold scrap is mixed with water and hydrocloric acid and chlorine gas is blown into the reactor, to dissolve the gold. Both methods use large amounts of water.

In gold leaching, using for example cyanide, it is essential to carry out the reaction in an aqueous system to facilitate ionisation of the sodium cyanide used to cyanide ions. Waste electronic scrap contains irregularly shaped pieces and will take up more volume than it would if compacted. But if compacted the leachant solution could not act on all the surfaces.

As an example, 382 grams of computer connector slots occupied a volume of 1000 $cm^3$ in a beaker. To fill the same beaker to the 1000 $cm^3$ mark required an additional volume of 770 $cm^3$ of water. Based on these figures, 1 tonne of waste electronic scrap would occupy a volume of approximately 2.6 $m^3$ and would require a volume of 2 $m^3$ leachant to fill the container. In practical terms a larger tank with a larger volume of leachant would be needed to allow for agitation.

In contrast, gaseous chlorine as used in the present invention can circulate freely and penetrate into small nooks and crannies of the electronic scrap to leach and dissolve the surface gold. Much smaller volumes of water can be used to merely moisten the surfaces to facilitate reaction.

Notwithstanding the state of the art there remains a need for alternative methods for recovering gold that mitigate some or all of the above mentioned problems.

OBJECTS OF THE INVENTION

It is an object of the present invention to provide for a method and apparatus for recovering gold from waste sources thereof, in particular, waste electronic materials.

It is further object of the present invention to allow for the recovery of gold in solutions of small volume. Consequently, consumption of resources, such as water is minimal.

A further object of the present invention is to provide for a gold recovery process that affords an aqueous solution of gold without environmentally unfriendly process or treatment chemicals, used to produce the leaching material.

Another object of the present invention further is to provide for a method and apparatus in which the chlorine gas is generated externally to a reactor vessel and subsequently pumped into the reactor vessel comprising the waste gold materials.

SUMMARY OF THE INVENTION

In a first aspect the present invention provides for a method of extracting gold from waste substrates or sources comprising gold, the method comprising the step of:
delivering chlorine gas to a vessel containing the substrate comprising gold, the vessel comprising a vessel inlet through which the chlorine gas is delivered and a vessel outlet,
delivering water vapour to the vessel, such that
the chlorine gas, substrate comprising gold and moisture present in the vessel interact to provide a gold solution which may be recovered from the vessel via the vessel outlet.

The gold solution may flow directly into the vessel outlet. Alternatively, the gold solution may be actively forced into the vessel outlet.

The substrate comprising gold is a waste source. In particular the waste source is decommissioned or scrap electrical goods or electrical goods which are being recycled.

The substrate comprising gold may be a substrate on to which the gold is plated or coated. For example, the substrate may be a metal, plastic or ceramic material on which gold has been plated or coated. For example, the substrate comprising gold may be a metal or metal alloy substrate on to which gold is plated or coated. Suitable metals include ferrous and non-ferrous metals. For example, the metal substrate on to which gold is plated or coated may be selected from the group consisting of nickel, copper, and alloys thereof.

In one particular embodiment, the substrate comprising gold comprises waste electronic materials, for example printed circuit boards. From an environmental perspective it is highly advantageous to efficiently recycle gold from waste electronic materials.

With reference to the method of the present invention, water vapour or moisture may be charged into the vessel by any means known to a person skilled in the art. For example, the substrate comprising gold may be sprayed with water prior to being placed in the vessel. In a preferred embodiment, moisture is pumped into the vessel as a fine water mist, spray or steam to create a moist atmosphere. Advantageously, the presence of steam may also speed up the gold extraction process. In order to pump moisture into the vessel it may further comprise a water inlet for pumping said spray, steam, or mist into the vessel.

Advantageously, by providing a source of chlorine that is external to the vessel and delivering the chlorine into the vessel, small volumes of water can be utilised to recover the gold. Where chlorine generation and gold recovery occur in the same vessel large volumes of water and additives are required.

Accordingly, using the method of the present invention gold can be recovered in a low volume solution free of any additives. Furthermore, once the gold has been recovered from the solution the resultant waste liquid that must be treated before final discharge is low in volume. Consequently, costs are reduced.

The absence of dissolved chemicals and additives in the water fed into the vessel also greatly reduces the costs associated with treating the water prior to discharge.

For example, approximately 2000 L of prior art cyanide leaching solution would be required to recover gold from a cubic meter of scrap printed circuit boards (PCBs). Using the method of the present invention, gold could be recovered from the same quantity of PCBs with 200 L of water.

Naturally, the costs associated with treating and handling 2000 L of cyanide solution prior to discharge are considerable. Such large volumes of a potentially toxic material are undesirable in any industrial process. Advantageously, the method of the present invention avoids toxic materials such as cyanide solutions.

Prior art processes for gold recovery are based on leaching and have utilised aqueous environments in which gold containing substrates are submerged in an aqueous solution in an aqueous leaching bath. Advantageously, the lower water volumes associated with the method of the present invention allow for vessels of smaller volume to be used than prior art gold recovery methods. The method of the present invention can be industrially scaled up without having to provide excessively large vessels to hold the waste gold materials, and water. The vessel must simply be large enough to hold the waste gold material. Thus, costs involved in setting up and maintaining the process are lower.

Since the process of the present invention uses much lower water volumes than prior art processes, effluent treatment costs are minimised. The lower water volumes also enables better control of the gold leaching process. Initially the gold concentration in the outlet stream would be high but would decrease towards zero when all the gold is leached. When it is apparent that all the gold has been leached off, either by visual inspection or by measurement of the gold content in the reactor outlet stream, it is easy to quench the reaction by purging the reactor vessel of chlorine gas by passing air or another gas through the vessel. This minimises leaching of other substrate metals such as copper, nickel etc. Such almost instant quenching is not possible with an aqueous leaching bath.

The method of the present invention also provides for gaseous inter-halogen compounds being delivered in to the vessel along with the chlorine gas through the vessel inlet. As used herein, the term inter-halogen compounds is used to refer to gaseous materials comprising two distinct halogen atoms. For example, compounds such as iodine chloride (ICl) and bromide chloride (BrCl). Advantageously, the presence of inter-halogen compounds has been shown to increase the efficiency of the leaching/recovery process relative to chlorine on its own. The inter-halogen compounds may be introduced by doping the chlorine gas with amounts of elemental iodine or bromine, or they may be produced electrolytically, vide infra.

With reference to the method of the present invention, the chlorine gas may be prepared in an electrolytic cell external to the vessel. For example, the chlorine can be prepared in the electrolytic cell and delivered into the vessel, upon preparation, to provide a constant stream of chlorine into the vessel. The electrolytic cell may be a divided electrolytic cell, i.e. the anode electrolyte and cathode electrolyte are separated from one another.

Advantageously, by separating the chlorine preparation step from the gold leaching step in the vessel, the electrolyte used for chlorine preparation can be of optimum purity and concentration. Moreover, the gold leaching step can be performed without the build-up of salts and contaminants from the electrolytic process.

The chlorine gas prepared by the electrolytic cell may be delivered along a conduit to the vessel inlet. Furthermore, the gaseous inter-halogen compounds may be prepared in the electrolytic cell and may be deliverable along the conduit to the vessel. Inter-halogen compounds may be generated by adding amounts of bromide salts, for example NaBr, and iodide salts, for example, NaI, to the electrolyte.

Suitably, the conduit is manufactured from a material that is incapable of being corroded by chlorine gas.

The method of the present invention may further comprise a quenching process such that when water exiting the vessel via the vessel outlet no longer comprises gold the process can be shut down quickly.

A sensor may be utilised to detect the presence of gold in water exiting the vessel via the vessel outlet.

The quenching process may comprise cutting off the supply of chlorine gas to the vessel and flushing the vessel with inert gas prior to discharge of the vessel. As used herein, the term inert gas is used to represent a non-toxic, non-reactive gas. For example, the inert gas may be selected from the group consisting of air, nitrogen, argon and combinations thereof.

For example, the current to the electrolytic cell can be switched off to halt the production of chlorine. The vessel can be flushed with air, or another non-reactive, inert gas such as nitrogen or argon to purge it of any residual chlorine gas. The scrap materials can be unloaded from the vessel, and the vessel can be charged with new waste materials to recommence the process again.

The gold solution which exits the vessel via the vessel outlet may be further treated to recover solid gold metal from the gold solution.

The skilled person will be familiar with a number of different methods of reducing the gold solution to gold metal. For example, the gold solution may be treated with reducing agents such as sulphur dioxide gas, hydroxylamine, hydrazine, hydrogen peroxide. Alternatively, the gold solution may be refined electrochemically, for example by electrowinning or electroplating. A number of different methods of reducing a gold solution to provide gold metal are disclosed in U.S. Pat. No. 3,957,505. Advantageously, the process of the invention operates at ambient or slightly above ambient temperatures whereas some prior art processes for gold recovery require temperatures of between 200 and 800° C. to volatilise gold chloride, thus requiring a high and therefore expensive energy input. The reaction of the invention will proceed more rapidly at higher temperatures. Temperatures from ambient to 70° C. give good results but the use of higher temperatures are not excluded, subject to practical problems involved with higher pressures at higher temperatures.

In a further aspect, the present invention provides for an apparatus for extracting gold from a substrate comprising gold, the apparatus comprising:

a reaction vessel configured to receive the substrate comprising gold, the reaction vessel comprising a vessel inlet, through which chlorine gas is delivered into the reaction vessel and a vessel outlet, a water inlet adapted to deliver water spray, steam, or mist into the vessel; and a source of chlorine gas in fluid communication with the vessel; such that the substrate comprising gold, chlorine gas and moisture present in the vessel interact to provide a gold solution which may be recovered from the vessel via the vessel outlet.

In one embodiment a conduit may extend from the vessel inlet to the source of chlorine gas to establish fluid communication therebetween.

Suitably, the conduit is manufactured from a material that is incapable of being corroded by chlorine gas.

With reference to the apparatus of the present invention the substrate comprising gold may be a substrate on to which the gold is plated or coated. For example, the substrate may be a metal, plastic or ceramic material on which gold has been plated or coated. For example, the substrate comprising gold may be a metal or metal alloy substrate on to which gold is plated or coated. Suitable metals include ferrous and non-ferrous metals. For example, the metal substrate on to which gold is plated or coated may be selected from the group consisting of nickel, copper, and alloys thereof.

In one particular embodiment, the substrate comprising gold comprises waste electronic materials, for example printed circuit boards. From an environmental perspective it is highly advantageous to efficiently recycle gold from waste electronic materials.

With reference to the apparatus of the present invention, moisture may be charged into the vessel by any means known to a person skilled in the art. For example, the substrate comprising gold may be sprayed with water prior to being placed in the vessel. In a preferred embodiment, moisture is pumped into the vessel as a fine water mist, spray, or steam. The vessel may further comprise a water inlet for pumping said spray, steam, or mist into the vessel. Advantageously, the presence of steam may also speed up the gold extraction process With reference to the apparatus of the present invention, the source of chlorine gas may be an electrolytic cell disposed external to the vessel. For example, the chlorine can be prepared in the electrolytic cell and delivered into the vessel, upon preparation, to provide a constant stream of chlorine into the vessel. The electrolytic cell may be a divided electrolytic cell, i.e. the anode electrolyte and cathode electrolyte are separated from one another.

The build-up of chlorine gas in the electrolytic cell may generate sufficient pressure to urge the chlorine gas from the electrolytic cell along the conduit and into the vessel.

The apparatus of the present invention may further comprise an urging means for urging chlorine gas from the source of chlorine gas along the conduit and in to the reaction vessel. The urging means may be a pump.

The source of chlorine in the apparatus of the present invention may further comprise a source of inter-halogen compounds. For example, compounds such as iodine chloride (ICl) and bromide chloride, BrCl. Advantageously, the presence of inter-halogen compounds has been shown to increase the efficiency of the process relative to chlorine on its own.

The gaseous inter-halogen compounds may be prepared in the electrolytic cell. Inter-halogen compounds may be generated by adding amounts of bromide salts, for example NaBr, and iodide salts, for example, NaI, to the electrolyte.

The vessel of the apparatus of the present invention may further comprise an inlet for flushing the vessel with an inert gas prior to discharge of the vessel. The inert gas may be selected from the group consisting of air, nitrogen, argon and combinations thereof.

The apparatus of the present invention may further comprise a collector for the gold solution.

Where suitable, it will be appreciated that all optional and/or preferred features of one embodiment of the invention may be combined with optional and/or preferred features of another/other embodiment(s) of the invention.

BRIEF DESCRIPTION OF THE DRAWINGS

Additional features and advantages of the present invention are described in, and will be apparent from, the detailed description of the invention and from the drawings in which:

FIG. 1 illustrates an apparatus for carrying out the gold recovery method of the present invention.

DETAILED DESCRIPTION OF THE INVENTION

It should be readily apparent to one of ordinary skill in the art that the examples disclosed herein below represent generalised examples only, and that other arrangements and methods capable of reproducing the invention are possible and are embraced by the present invention.

FIG. 1 illustrates an embodiment of the present invention. An electrolytic cell 101 is disposed external to a (reactor) vessel 102, the latter being charged with substrates comprising gold 103. By way of example, the substrates comprising gold 103 may be waste electrical goods, for example printed circuit boards, in which gold is plated or coated onto another material such as copper or nickel. A conduit 104 allows for fluid communication between the vessel 102 and the electrolytic cell 101. Naturally, the conduit 104 will be manufactured from a material that is incapable of being corroded by chlorine gas.

The electrolytic cell 101 is a divided cell having an anode chamber 105 and cathode chamber 106. A membrane 107 divides the anode 108 and cathode 109. A pump 110 feeds the anode electrolyte or anolyte 111 to the anode 108. The anode electrolyte 111 primarily consists of chloride salts, such as NaCl or KCl. However, the anode electrolyte 109 may also comprise small amounts of bromide and iodide salts, e.g. NaBr, NaI, KBr or KI to provide a source of inter-halogen compounds. A flow meter 112 regulates the flow of chlorine gas produced at the anode away from the anode 108.

A second pump 113 feeds the cathode electrolyte or catholyte 114 to the cathode 109. Typically, the cathode electrolyte 114 is a NaOH or KOH solution. A flow meter 115 regulates the flow of hydrogen gas produced at the cathode away from the cathode 109. An outlet 116 provides an exhaust for hydrogen gas generated during the electrolytic process.

In the embodiment shown, the vessel 102 has a chlorine gas inlet 117 and a water inlet 118. Water is fed to the water inlet 118 through conduit 119. An outlet 120 provides an exit for an aqueous solution of recovered gold. The gold solution travels along conduit 121 to a collection flask or container (not shown).

Conduit 122 provides an outlet for any excess chlorine gas.

In use, the NaCl electrolyte 111 delivered to the anode 108 is oxidised to yield chlorine gas:

$$2NaCl \rightarrow Cl_2 + 2Na^+ + 2e^-$$

As indicated supra, the presence of chloride and bromide salts, such as NaBr and NaI can result in the formation of gaseous inter-halogen compounds BrCl and ICl. The presence of these compounds improves the efficiency of the chlorine leaching process. The inter-halogen compounds may be formed by reaction of halogens in elemental form as follows:

$$2NaBr \rightarrow Br_2 + 2Na^+ + 2e^-$$

$$2NaI \rightarrow I_2 + 2Na^+ + 2e^-$$

$$I_2 + Cl_2 \rightarrow 2ICl$$

$$Br_2 + Cl_2 \rightarrow 2BrCl$$

At the cathode 109, hydrogen gas is generated from the electrolyte 114 according to the following equation:

$$2H_2O + 2e^- \rightarrow H_2 + 2OH^-$$

The membrane 107 prevents the anolyte and the catholyte mixing, and it stops the chlorine forming at the anode 108 from mixing with the sodium hydroxide and the hydrogen formed at the cathode. The hydrogen gas generated as a by-product of the electrolytic process exits the cell via outlet 116.

Chlorine gas generated at the anode 108 flows into the conduit 104 and into the vessel 102 via vessel inlet 117. Water is introduced into the vessel 102 through water inlet 118 from water conduit 119. Water inlet 118 may comprise a nozzle to pump the water in as a fine mist, spray, or steam. By using a fine water mist, spray or steam the final volume of the gold solution is vastly reduced compared to prior art methods of gold recovery. Advantageously, a low volume solution is cheaper to treat prior to discharging it as effluent.

Upon contact with the waste electrical materials comprising gold, the chlorine gas (and any inter-halogen compounds present), gold and water react to afford an aqueous solution of gold recovered from the waste materials. The aqueous gold solution exits the vessel through outlet 120 and passes along conduit 121 to a collection flask/container.

The gold solution which exits the vessel via the vessel outlet 120 may be further treated to recover solid gold metal from the gold solution. The skilled person will be familiar with a number of different methods of reducing the gold solution to gold metal. For example, the gold solution may be treated with reducing agents such as sulphur dioxide gas, hydroxylamine, hydrazine, hydrogen peroxide. Alternatively, the gold solution may be refined electrochemically, for example by electrowinning or electroplating. A number of different methods of reducing a gold solution to provide gold metal are disclosed in U.S. Pat. No. 3,957,505.

Conduit 121 may internally house a gold sensor or detector. When solution exiting the vessel 102 through outlet 120 no longer contains any gold, current to the electrolytic cell 101 can be stopped to halt chlorine production. The vessel 102 can be flushed with a non-reactive gas such as air, nitrogen or argon to expel any residual chlorine gas and the now gold depleted waste electronic materials 103 can be discharged from the vessel 102 to be replaced by new materials.

A reiteration of the process can be easily commenced by recharging the vessel 102 with new waste electronic materials 103.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A method of extracting gold from a substrate comprising gold, the method comprising the step of:
    delivering chlorine gas to a vessel containing the substrate comprising gold, the vessel comprising a vessel inlet through which the chlorine gas is delivered and a vessel outlet, wherein the chlorine gas, the substrate comprising gold, and moisture present in the vessel interact to provide a gold solution which is recovered from the vessel via the vessel outlet, wherein the moisture present in the vessel is a water mist, vapor, spray, and/or steam delivered into the vessel.

2. The method according to claim 1, wherein the chlorine gas is prepared in an electrolytic cell external to the vessel.

3. The method according to claim 2, wherein the chlorine gas prepared by the electrolytic cell is delivered along a conduit to the vessel.

4. The method according to claim 2, wherein at least one gaseous inter-halogen compound is prepared in the electrolytic cell and is deliverable along the conduit to the vessel.

5. The method of claim 4, wherein the inter-halogen compound comprises iodine chloride (ICl) and/or bromide chloride (BrCl).

6. The method of claim 1, wherein the substrate comprising gold is a substrate on which the gold is plated or coated.

7. The method of claim 1, wherein the substrate comprising gold is a metal substrate, a plastic substrate or a ceramic substrate on which gold is plated or coated.

8. The method of claim 7, wherein the metal substrate comprises metal selected from the group consisting of nickel, nickel alloys, copper, and copper alloys.

9. The method of claim 1, wherein the substrate comprising gold comprises waste electronic materials.

10. The method of claim 9, wherein the waste electronic materials comprise printed circuit boards.

11. A method of extracting gold from a substrate comprising gold, the method comprising the step of:

delivering chlorine gas to a vessel containing the substrate comprising gold, the vessel comprising a vessel inlet through which the chlorine gas is delivered and a vessel outlet, wherein the chlorine gas, the substrate comprising gold, and moisture present in the vessel interact to provide a gold solution which is recovered from the vessel via the vessel outlet, wherein at least one gaseous interhalogen compound is delivered into the vessel along with the chlorine gas through the vessel inlet.

12. The method of claim 11, wherein the inter-halogen compound comprises iodine chloride (ICl) and/or bromide chloride (BrCl).

13. The method of claim 11, wherein the substrate comprising gold is a substrate on which the gold is plated or coated.

14. The method of claim 11, wherein the substrate comprising gold is a metal substrate, a plastic substrate or a ceramic substrate on which gold is plated or coated.

15. The method of claim 14, wherein the metal substrate comprises metal selected from the group consisting of nickel, nickel alloys, copper, and copper alloys.

16. The method of claim 11, wherein the substrate comprising gold comprises waste electronic materials.

17. The method of claim 16, wherein the waste electronic materials comprise printed circuit boards.

* * * * *